US009486656B2

(12) United States Patent
Hutton

(10) Patent No.: US 9,486,656 B2
(45) Date of Patent: Nov. 8, 2016

(54) FIRE SUPPRESSION BLANKET

(71) Applicant: Leonard Hutton, Los Angeles, CA (US)

(72) Inventor: Leonard Hutton, Los Angeles, CA (US)

( * ) Notice: Subject to any disclaimer, the term of this patent is extended or adjusted under 35 U.S.C. 154(b) by 351 days.

(21) Appl. No.: 14/295,883

(22) Filed: Jun. 4, 2014

(65) Prior Publication Data

US 2015/0000938 A1 Jan. 1, 2015

(51) Int. Cl.
*A62C 8/00* (2006.01)
*A62C 8/06* (2006.01)
*A62C 3/02* (2006.01)

(52) U.S. Cl.
CPC ............... *A62C 8/06* (2013.01); *A62C 3/0257* (2013.01)

(58) Field of Classification Search
CPC ............ A62C 2/00; A62C 2/04; A62C 2/06; A62C 3/00; A62C 3/14; A62C 8/06; A62C 3/0257
USPC ...................................................... 169/48, 49
See application file for complete search history.

(56) References Cited

U.S. PATENT DOCUMENTS 2,720,269 A * 10/1955 Diacos .................... A62C 8/06 169/50
3,576,212 A 4/1971 Siler
3,635,290 A 1/1972 Schneider
4,149,649 A 4/1979 Szego
4,714,652 A 12/1987 Poletto
4,822,524 A 4/1989 Strickland
5,165,482 A 11/1992 Smagac
5,423,150 A * 6/1995 Hitchcock ............ A62C 3/0214 169/45
5,520,999 A 5/1996 Van Skyhawk
5,608,992 A * 3/1997 Floyd ........................ E04B 1/94 135/115
5,738,175 A 4/1998 Alhamad
5,875,598 A 3/1999 Batten
5,921,388 A 7/1999 Petrilli
5,944,114 A 8/1999 Farley
6,125,941 A 10/2000 Lokken
6,521,362 B2 2/2003 Koeppen
6,660,190 B2 12/2003 Huhn
6,742,305 B2 6/2004 Rogers
6,983,805 B2 * 1/2006 Chattaway ............... A62C 8/06 169/36
7,128,207 B2 * 10/2006 Anderson ................. B32B 7/08 135/126
7,165,626 B2 1/2007 Treddenick
7,210,537 B1 5/2007 McNeil
7,261,165 B1 8/2007 Black
7,395,869 B2 7/2008 Schnabel
7,673,696 B1 3/2010 Gunn
7,690,438 B2 4/2010 Alvarez
7,947,614 B2 5/2011 Hanna
8,088,310 B2 1/2012 Lorr
8,146,298 B2 4/2012 Bush
(Continued)

*Primary Examiner* — Justin Jonaitis
(74) *Attorney, Agent, or Firm* — Robert J. Lauson; Lauson & Tarver LLP

(57) ABSTRACT

A blanket for fighting grass and scrub fires along a fire line includes a sheet of fire resistant material forming a lattice with multiple openings. The openings vary in size from larger openings along the sheet's front edge to smaller openings at the sheet's back edge. The lattice is preferably formed of woven fire resistant fiberglass strips coated in vermiculite. The sheet is preferably rectangular, flexible for rolling, and multiple sheets may be lined up along the fire line. To preserve the shape of the sheet, connectors may secure the woven strips together at points where the woven strips overlap. The sheet can be placed atop or near grass or scrub at risk of burning, arranged with the front edge toward the fire and the back edge away from the fire. Once the burning risk passes, the sheet or sheets may be removed and rolled up for storage or transport.

9 Claims, 5 Drawing Sheets

10

(56) References Cited

U.S. PATENT DOCUMENTS

| | | | | |
|---|---|---|---|---|
| 8,246,733 | B2 | 8/2012 | DeBrouse | |
| 8,297,371 | B1 | 10/2012 | Musser, Jr. | |
| 8,573,125 | B1 * | 11/2013 | Rossow | F42D 5/05 102/303 |
| 2003/0066660 | A1 | 4/2003 | Horwell | |
| 2004/0000409 | A1 | 1/2004 | Abbott | |
| 2005/0103506 | A1 | 5/2005 | Warrack | |
| 2005/0161235 | A1 | 7/2005 | Chuprin | |
| 2005/0189122 | A1 | 9/2005 | Wippich | |
| 2005/0269109 | A1 | 12/2005 | Maguire | |
| 2006/0124321 | A1 | 6/2006 | Aamodt | |
| 2006/0124322 | A1 | 6/2006 | Goldburt | |
| 2006/0213672 | A1 | 9/2006 | Mohr | |
| 2009/0176429 | A1 | 7/2009 | Chang | |
| 2009/0194297 | A1 | 8/2009 | Teruel | |
| 2009/0258180 | A1 | 10/2009 | Goulet | |
| 2009/0266567 | A1 | 10/2009 | Musser, Jr. | |
| 2010/0294520 | A1 * | 11/2010 | Aguirre | A62C 3/0257 169/45 |
| 2012/0067600 | A1 * | 3/2012 | Bourakov | A62C 3/0228 169/46 |
| 2014/0357142 | A1 * | 12/2014 | Petty | F16L 59/145 442/1 |
| 2016/0040962 | A1 * | 2/2016 | Rossow | B32B 5/06 89/36.02 |

* cited by examiner

FIRE SUPPRESSION BLANKET

This application claims the priority benefit of U.S. provisional application No. 61/840,414, filed Jun. 27, 2013.

BACKGROUND

Wildfires are common in western states, for example California, wherein approximately two million homes face extreme wildfire hazards, particularly in the southern part of the state, due to a proximity to fuels such as trees grass and brush.

Current fire fighting tactics require intensive coordination as ground and air resources are deployed to fight fires threatening homes. Ground resources typically include teams or groups of people with little fire fighting training, who are deployed to dig fire lines in advance of approaching flames. Frequently, wildfires are of such intensity and occur in such strong winds that burning debris blows over the fire line and subsequent fire lines must be created. This process can occur many times over as ground crews attempt to stay ahead of the fire.

Fire suppression covers or blankets are known in the art. U.S. Pat. No. 2,720,269 to Diacos discloses a fire blanket made of fire-resistant material. The Diacos reference is designed for small in-home fires and includes a weighted hem. Diacos is not suited for outdoor fire suppression due to its size, and if expanded to adequately cover a large area, would be prohibitively heavy.

U.S. Pat. No. 6,125,941 to Lokken discloses a blanket for smothering fires or protecting items from a fire comprising a wettable polymer capable of high volume water retention, a water reservoir and heat activatable valves to permit water to flow from the reservoir into the blanket. While Lokken may be adapted for fighting outdoor wildfires, it is disfavored due to its complex and expensive construction, requirement for water, and the difficulty of cleaning and re-using the blanket.

U.S. Pat. No. 8,297,371 to Musser, Jr. discloses a fire protection system for preventing an area from catching fire, comprising a large tarp for draping over the area. Cables slidably attached along the side edges of the tarp via eyelets help guide the tarp around structures. Musser, Jr. is disfavored because it must be supported by a support structure, such as a crane or helicopter in order to function. It also is deployed directly against a structure, increasing the likelihood that a fire will ignite the structure.

There is therefore a need for a blanket-type fire suppression device which is lightweight, inexpensive and easy to construct, which avoids the need for water or support materials in order to function. There is also a need for an apparatus, deployable as a around tire suppression resource, capable of reducing a fire to a more manageable size and intensity, allowing it to be more easily extinguished by trained fire fighters.

SUMMARY

A fire suppressing blanket for fighting grass and scrub (defined as low shrub) fires along a fire line includes a sheet made of a fire resistant material. The sheet has a lattice defining multiple openings. The openings vary in size from larger openings along a front edge of the sheet to smaller openings toward an opposing back edge of the sheet. The lattice is formed by woven strips of fire resistant material. Preferably, a first sheet may be attachable to additional sheets, allowing the sheets to be laid out side by side along the fire line, and the sheet material is flexible for rolling.

The fire resistant material may include or be made from fiberglass coated in vermiculite, and the woven strips of fire resistant material may be woven in a substantially perpendicular warp and weft orientation in keeping with the sheet's rectangular shape. Connectors secured the woven strips together at points where the woven strips overlap to preserve the shape of the sheet.

In order to suppress an outdoor grass or scrub fire, a user first obtains one or more sheets of fire suppressing lattice having larger openings along a front edge varying to smaller openings along a back edge. The sheet is laid atop or near the grass or the scrub at risk of burning, and is arranged so that the front edge is toward the fire and the back edge is away from the fire. If necessary, multiple sheets may be placed end to end along the fire line to counter a large approaching fire. Once the risk of burning passes, the sheet may be removed from the grass or scrub and rolled up for storage or transport.

DESCRIPTION

Figure 1:
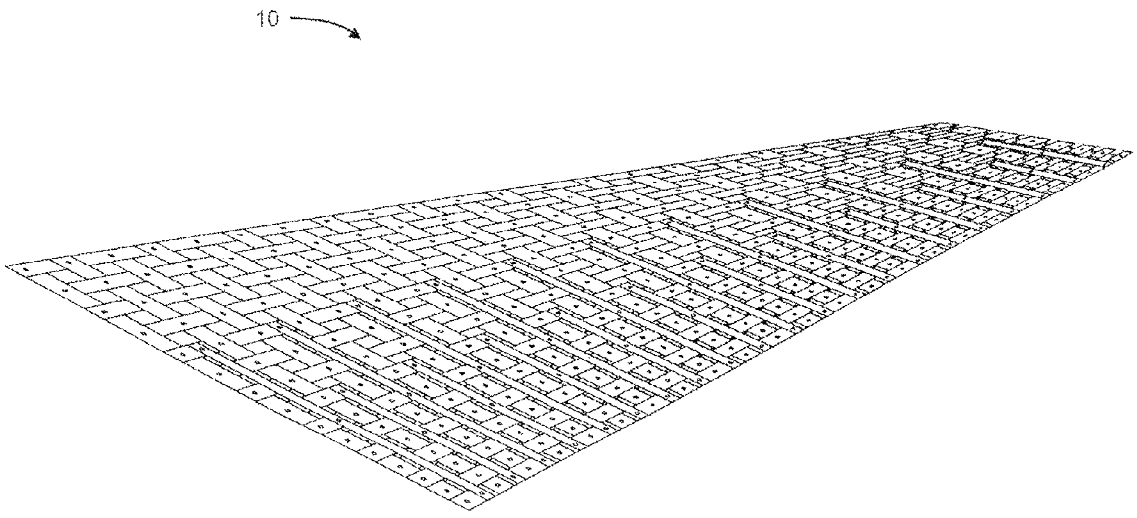
FIG. 1 is a perspective view of a lattice made of thermal and fire resisting fabric in a rolled-out arrangement.

Referring to FIGS. 1-5, in a preferred embodiment, a loose, thin pattern of light weight fire resistant material is formed in a lattice 10 and placed in the path of a fire. While not appropriate for fires in trees, the lattice 10 is adapted to cover low-lying grasses and small shrubs. By covering grass and scrub, the lattice 10 introduces thermal resistance and makes it difficult for the fire to maintain its rate of speed, height, and intensity.

The lattice 10 presents a horizontal fabric "fence" that lies on the ground. Preferably, a series of lattices 10 (see, e.g., FIG. 5) are arranged in series as long as necessary to compensate for the size of an approaching fire. In one embodiment the lattice 10 may be approximately twenty five feet long and ten feet wide. The lattice 10 presents a pattern of thermal resistance against the fire without moving parts or electronics, no requirement for assembly and no requirement for water or fire suppressing chemicals. In addition, the lattice 10 is lightweight, reusable, and may be discarded or repaired and re-used as desired.

For example, when several of lattices 10 are lined up together as a defensive system end to end in a line of 300 feet, which can be accomplished in several minutes, the back lot lines of between six and eight standard tract homes can be effectively protected from an approaching fire. By quickly protecting a broad area, valuable resources can be reallocated to other firefighting activities, reducing the effort required by multiple fire lines.

By rolling out the lattice 10 on the ground and over the small shrubs and other fuels downwind of the path of the flames, the wind will effectively push the fire into the lattice 10 which snares it in an alternating and repeating, lattice pattern 22, 24 (FIG. 3) which grows smaller and smaller, reducing open areas while increasing the material covered areas creating further resistance.

The capturing and dissipating effect that occurs when the fire is "entangled" in the pattern is accomplished by the fire resistant material preventing the fuel below the lattice 10 from igniting due to the flames above the pattern. Secondly, any existing fire under the pattern is enclosed in a loose structure providing less open air and an increasing fire resistant material surface area the farther the fire is pushed into the pattern. This incremental closing of the open spaces or apertures in the lattice 10 increases resistance and further reduces the availability of adequate ventilation and fuel to effectively choke out the fire.

As a fire burns under the lattice 10, it pushes the flames through the apertures 22, 24 in an inverted funnel pattern upward. Since the same gaps are also needed to provide adequate ventilation for burning, any path below the pattern is constricted reducing the oxygen available to the fire. This increasingly constrictive process dissipates the energy output, weakening the fire and causing the flame height to decrease and re-stabilize as a lower intensity fire.

As the fire is pushed by the wind toward areas of the lattice 10 where the strips of fire-resistant material (primary strip 12, secondary strip 14, tertiary strip 16 and quaternary strip 18) are placed closer together than in previous rows, the cycle is repeated. The constricting effect of increasing the area covered by fire resistant material while decreasing the available open area creates a cascading effect, ultimately driving the fire to smaller and smaller remaining openings in the pattern the farther it advances until there are no more open areas left in the pattern effectively denying fire the fuel and open areas to re-generate and grow while under the lattice 10.

In use, the lattice 10 allows firefighters to lay out as many individual lattices as necessary and wait until a fire has navigated through the pattern and been significantly reduced in both height and intensity before engaging the fire using traditional fire fighting methods. The lattice 10 also adds a barrier providing a level of safety for firefighters by providing a fire resistant barrier between the fire and the firefighter.

Referring to FIG. 1, a perspective illustration of the overall look and design of a preferred embodiment of the lattice 10 is shown including the differential nature of the tightness of the lattice 10. When oriented relative to wind direction, the front of the lattice pattern encountered first by a fire has greater apertures or openings, which decrease in size as the fire travels across the lattice. By the time the fire reaches the far side the lattice, the apertures are at their smallest size, thereby denying open space and fuel to the fire.

Figure 2:
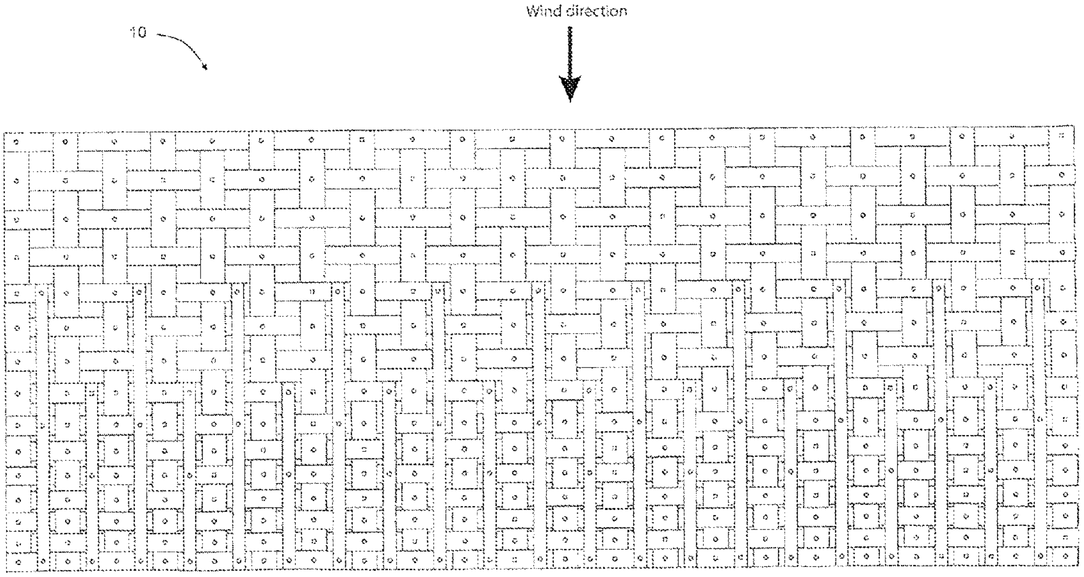
FIG. 2 is a top view of the lattice showing the increasingly tight lattice pattern oriented against wind direction.

Referring to FIG. 2, a top view of the lattice 10 is shown depicting more detail of the individual components of the design, and the proper orientation in relation to wind direction. In particular, as the apertures in the lattice 10 decrease in size, additional strips of fire resistant material are used to increase the surface area of the lattice.

Figure 3:
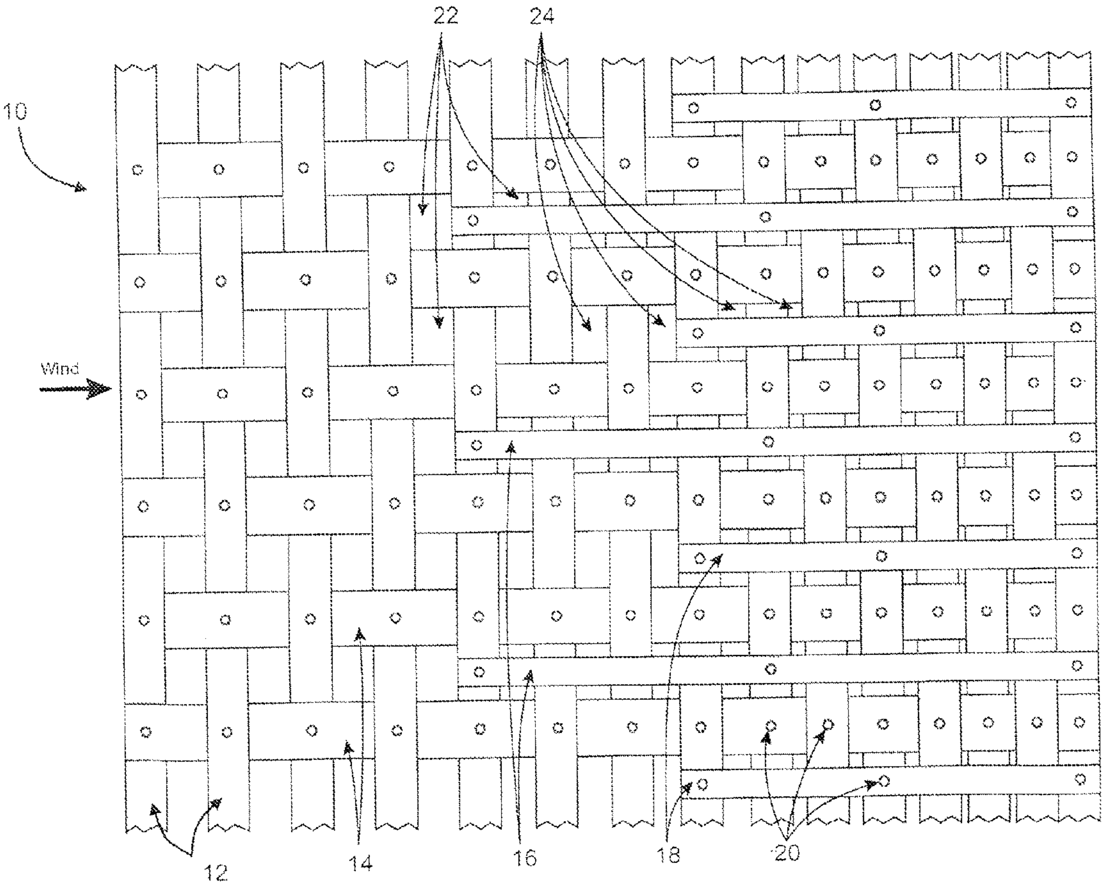
FIG. 3 is a top view of an enlarged portion of the lattice showing its orientation to the wind and the individual components of the tire resisting lattice fabric pattern and gaps.

FIG. 3 is a top view of a section of the lattice 10 and shows a detailed and enlarged view of its components. The individual elements required for manufacturing the completed lattice 10 are shown as follows:

In a preferred embodiment, the lattice 10 has a standard size of approximately 25 feet long and 10 feet wide (see, FIGS. 1 and 2), although other sizes are contemplated according to preference and application. The standard material is a fire-resistant flexible fiberglass having a thickness of approximately 1/16 of an inch which creates a thickness of 1/8 inch at each intersection of material.

Still referring to FIG. 3, the preferred lattice 10 pattern requires four different lengths of material and three different widths of material in order to create the lattice 10. Primary strips 12 of fiberglass material approximately 25 feet long and 6 inches wide, run the length of the lattice 10. Secondary strips 14 of fiberglass material approximately 9 feet long and 8 inches wide, which run the width of the lattice 10. Tertiary strips 16 of fiberglass material approximately 6 feet long and 4 inches wide, are long inserts, which partially cover the width of the lattice, and quaternary strips 18 of fiberglass material approximately 3 feet long and 4 inches wide representing the short inserts, which partially cover the width of the lattice 10. A series of brass or other metal grommets 20 are used to fasten the material at intersections, in some embodiments every intersection of material, to create the lattice pattern shown in FIGS. 1-3.

Still referring to FIG. 3, the primary strips 12 secondary strips 14, tertiary strips 16 and quaternary strips 18 are shown intersecting and creating a woven pattern. The intersections have grommets 20, thereby preserving the orientation of the strips and holding them in a square lattice pattern. The grommets 20 also preserve the distance between the strips. In one embodiment, the grommets 20 compress washers against the strips 12, 14, 16, and 18 in order to better grip the material. Preferably rubber hose washers are used in connection with the grommets 20. The pattern of the primary strips 12 and secondary strips 14 creates a series of large apertures 22 in the portion of the lattice first encountered by a fire. The large apertures 22 decrease in size as a fire progresses through the lattice 10.

Once a fire reaches approximately mid-way across the lattice 10 it encounters the tertiary strips 16 and quaternary strips 18, also intersecting in a woven pattern. The tertiary strips 16 and quaternary strips 18 help to take up the spaces between the primary strips 12 and secondary strips 16. All of the primary strips 12 are placed incrementally closer and closer together until they eventually touch at the far edge of the lattice 10, eliminating all open areas of the lattice 10 as shown in FIGS. 1-3. The tertiary strips 16 and quaternary strips 18 are made of the same material as the overall lattice but are preferably 4 inch wide strips of varying lengths for placement in the 8 inch wide openings. This arrangement reduces the apertures in the lattice to suppress the fire as it approaches the rear of the lattice.

Another important aspect of the preferred embodiment includes an available factory coating of the fire resistant material with vermiculite. Such a coating improves the thermal characteristics of the fiberglass and provides the capability of withstanding fires of up to 2000 degrees Fahrenheit for up to 15 minutes.

Figure 4:
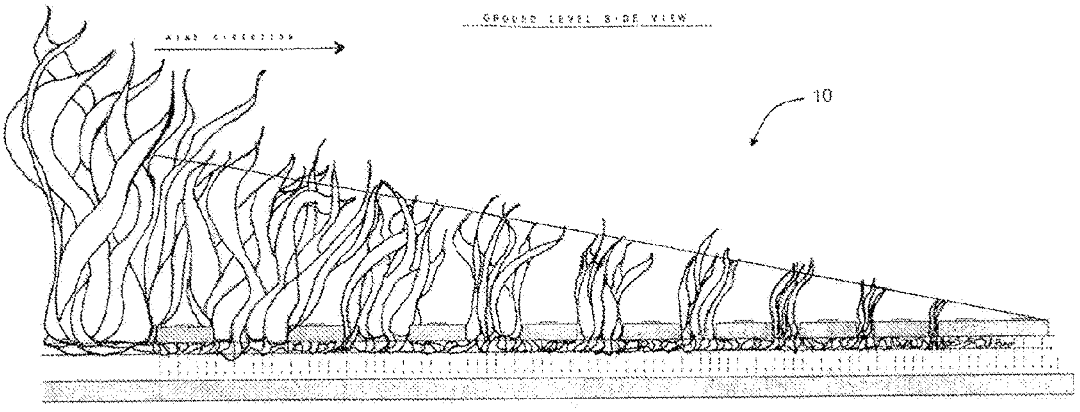
FIG. 4 is a side view of a fire moving, across the lattice in relation to wind direction, and showing the decreasing size of the lattice apertures as a fire is pushed further into the lattice by the wind.

Referring to FIG. 4, a preferred embodiment of the lattice 10 is shown in side view. As a fire passes across the lattice, the openings in the lattice decrease in size causing a corresponding decrease in the height of the flames. Predictably, at the edge of the lattice furthest from the ignition point of the fire, no openings are present which prevents air from reaching the fire under the lattice 10. Although embers may remain present under the lattice 10, by leaving the lattice in place for a sufficiently long period of time, the likelihood of a fire continuing past the lattice 10 is greatly reduced.

Figure 5:
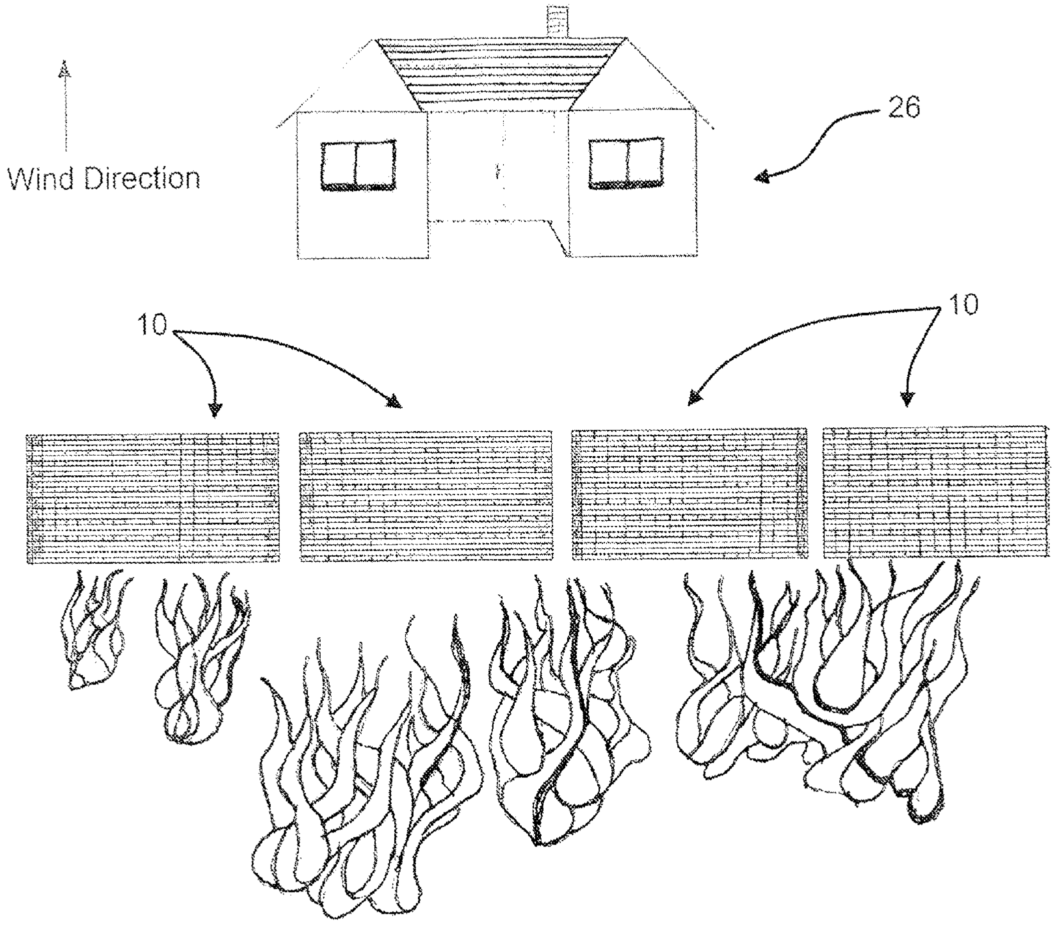
FIG. 5 shows a house in the path of a fire and placement of several lattices in series in relation to wind direction.

Referring to FIG. 5, several lattices 10 according to a preferred embodiment are shown pre-positioned in a fire resisting pattern in the back of a house 26 threatened by fire. By pre-positioning the lattices 10, the house 26 is protected when fire crews are unavailable to spray water on the fire, as in the case of an evacuation.

A series of four small scale wind tunnel tests at 4-5 MPH were performed on Mar. 15, 2013 in a US Department of Agriculture Fire Science testing facility located near Corona, Calif., in order to demonstrate that a large fire can be entangled, take longer to move a given distance and be influenced while being reduced in size using a thin fiberglass material only 1⁄16"-1⁄8" thick.

Three different sizes of the same pattern were assembled using the same material (2", 3", and 4") strips of temperature resistant fiberglass material. The material is coated with vermiculite to increase the temperature rating up to 2000 F for a duration of 15 minutes of direct exposure. The material was laid out in a pattern with holes throughout the pattern for the energy to be focused and dissipated.

A 6-8" thick bed of Excelsior was used on 4 separate tests as fuel to test the patterns which were all placed loosely on top and spread out to encompass the entire fuel bed which was roughly 3' wide by 6' long. A 1 foot length of excelsior was used as the wick to get a large fire started before impacting the pattern. The 4th test was the control test to show the height and intensity of the same fire with no pattern placed on top to impede it.

In test no. 1, the height of the flame before contacting the pattern was approximately 5½-6 ft tall. The height of the flame immediately after contacting the pattern was approximately 4-5 ft tail, and the height of the flame 1 minute after contacting the pattern was approximately 3-4 ft tall.

In test no. 2, the height of the flame before contacting the pattern was approximately 5 ft tall. The height of the flame immediately after contacting the pattern was approximately 4-5 ft tall, and the height of the flame 1 minute after contacting the pattern was approximately 3-4 ft tall.

In test no. 3, the height of the flame before contacting the pattern was approximately 6½-7 ft tall. The height of the flame immediately after contacting the pattern was approximately 5 ft tall, and the height of the flame 1 minute after contacting the pattern was approximately 3-4 ft tall.

In test no. 4, the height of the flame in 1st 15 seconds was approximately 6½-8 ft tall. The height of the flame in the next 30 seconds was approximately 6½-7 ft tall, and the height of the flame 1 minute after was approximately 6½-7 ft tall.

Observations of these tests indicated that in the 3rd experiment, the smallest pattern (2×2) seemed to take the longest to burn through to the end. It also appeared to cut down the intensity the most. The smaller the opening translated into the longer it will take for the fire to consume the fuel underneath. The wider the material the less holes are in the material. Using a wider material with small opening provided the best results. The fire was effectively steered into an area of the pattern on the 3×3 setup evidenced by the burn pattern photos by leaving an opening greater than the area around it.

Other observations included that the heat patterns on the sides of all 3 showed little heat degradation compared to the center of the pattern directly on top of the fuel bed where the path of the fire could be traced by looking at the brass fasteners and the different color patterns. The thin nature of the material gives it flexibility and is still able to disrupt the normal fire behavior effectively snaring it and creating a repeating resistance beneath the material. The fire did not "skip" across the pattern even with a 4-6 MPH wind but went under and slowed down due to the fabric above it and the structure of the pattern blocking the wind. The intensity and ferocity in each burn was significantly reduced and calmed when compared to the control burn #4. Finally, the controller; Dr. Weiss from the Department of Forestry, stated the experiment did reduce the fire and that a smaller fire is an easier managed fire. His observation indicated that all 3 tests patterns were effective in achieving the size reduction needed for extinguishing a fire with less effort.

A major benefit of the lattice includes the improved effectiveness of water. Without the lattice, a larger amount of water would be needed due to the higher evaporation rate due to the temperatures of the flames. With the lattice breaking down the fire, water can be strategically sprayed at the back end of the pattern when the fire has been reduced down and temperatures are lessened.

Another benefit involves its immediate reusability allowing a lattice to be re-deployed several times during a fire if needed; providing an immediate benefit in utility, availability and value. The fire-resistant fabric will degrade as a result of multiple fire exposures and is not to be considered as having unlimited life, but rather several lives depending on the cumulative exposure to fire. The time required for the fire to pass through the pattern is about five minutes given a slight 4-5 mile per hour wind and the material is rated for 15 minutes; therefore it is reasonable to expect the material to be reusable 2 or 3 times.

Another benefit is that lattice patterns are customizable with regard to lengths, widths, thicknesses, inserts, and color; providing the most flexibility. Weight can be reduced or increased by adding or subtracting length, width and thickness depending on the customer need.

The foregoing description of the preferred embodiment of the invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A fire suppression blanket for fighting grass and scrub fires along, a fire line, comprising:
- a sheet made of fire resistant material;
- the sheet having a lattice defining a multiplicity of openings;
- wherein the openings vary in size from larger openings along a front edge of the sheet to smaller openings toward an opposing back edge of the sheet.

2. The apparatus of claim 1 wherein the lattice is formed by woven strips of fire resistant material.

3. The apparatus of claim 1 wherein the sheet is configured to be attachable to a second sheet, for connecting sheets together along the fire line.

4. The apparatus of claim 1 wherein the sheet material is flexible for rolling.

5. The apparatus of claim 1 wherein the fire resistant material is fiberglass coated in vermiculite.

6. The apparatus of claim 2 wherein the woven strips are woven in a substantially perpendicular warp and weft orientation.

7. The apparatus of claim 2 further comprising connectors securing together the woven strips at points where the woven strips overlap.

8. A method of suppressing an outdoor grass or scrub fire comprising the steps of:

obtaining a sheet of fire suppressing lattice having larger openings along a front edge and smaller openings as the lattice extends to a back edge;

laying the sheet proximate the grass or the scrub at risk of burning;

arranging the sheet so that the front edge is toward the fire and the back edge away from the fire; and removing the sheet from the grass or scrub after the risk of burning passes.

9. The method of claim 8 including the step of placing multiple sheets end to end along the fire line.

* * * * *